(12) United States Patent
Lum et al.

(10) Patent No.: US 7,554,073 B2
(45) Date of Patent: Jun. 30, 2009

(54) HIGH LINEARITY CMOS AMBIENT LIGHT SENSOR

(75) Inventors: Kok Keong Richard Lum, Singapore (SG); Kah Weng Lee, Singapore (SG); Bin Zhang, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/625,767

(22) Filed: Jan. 22, 2007

(65) Prior Publication Data
US 2008/0173796 A1 Jul. 24, 2008

(51) Int. Cl.
*H05B 37/02* (2006.01)
(52) U.S. Cl. .................................. 250/214 AL
(58) Field of Classification Search ........... 250/214 AL, 250/214 A, 214 LA; 348/227.1, 602, 603; 345/207
See application file for complete search history.

(56) References Cited

U.S. PATENT DOCUMENTS

| | | | | | |
|---|---|---|---|---|---|
| 4,485,301 | A | * | 11/1984 | Gontowski et al. | 250/214 A |
| 4,714,827 | A | * | 12/1987 | Akita | 250/214 C |
| 5,057,682 | A | * | 10/1991 | Michon et al. | 250/214 C |
| 2005/0110740 | A1 | * | 5/2005 | Linzmeier et al. | 345/102 |

* cited by examiner

*Primary Examiner*—Georgia Y Epps
*Assistant Examiner*—Kevin Wyatt

(57) ABSTRACT

A light sensor having first and second photodetectors and a current mirror is disclosed. The first photodetector receives a light signal and generates a light current proportional to the light intensity received by the first photodetector and a dark current that is independent of the light intensity. The second photodetector is connected in series with the first photodetector at a first node. The second photodetector has a covering that prevents light from reaching the second photodetector. The second photodetector generates a current equal to the dark current. The first photodetector is connected to a power source and the second photodetector is connected to an output node. The current mirror is connected to the first node and the output node and generates an output current that is proportional to the light current through the output node when the output node is connected to an external circuit.

4 Claims, 2 Drawing Sheets

HIGH LINEARITY CMOS AMBIENT LIGHT SENSOR

BACKGROUND OF THE INVENTION

Ambient light sensors based on CMOS photodiodes are used in a number of light sensing applications. For example, many mobile devices such as mobile phones and PDAs utilize backlit displays that represent a significant fraction of the power drawn from the batteries. In the absence of an ambient light sensor, such devices must set the power level of the backlight source relatively high so that the screen will be visible in high ambient light environments such as out of doors in bright sunlight. This results in a significant reduction in the operation time on batteries. To reduce the power drain, and hence, increase the battery-powered operation time of the device, the intensity of the backlight is adjusted to provide the correct light level based on the ambient light intensity in which the device is operating by incorporating an ambient light sensor in the device. If the device is being utilized outside in daylight, the ambient light intensity is high, and hence, the backlight source must be increased in intensity so that the display is easily visible. However, if the device is being utilized indoors in a low ambient light environment, the backlight source can be reduced in intensity, and hence, the power drain on the batteries can be reduced compared to the high ambient light In a typical light sensor, the current generated by the photodiode is amplified to provide a signal that is linearly related to the intensity of the light received by the photodiode. While the current generated by the photodiode is linearly related to the light intensity of the light received by the photodiode, the amplifiers introduce non-linearities that limit the usefulness of such light sensors for some applications.

Various amplifier designs have been utilized to convert the relatively small signal generated by the photodiode to a current or voltage signal having an amplitude that is sufficient to be utilized by conventional processing circuitry. These designs suffer from non-linearities at high gain values and from dark current problems at low light levels. CMOS photodiodes generate a significant current when not illuminated by light in the typical amplifier circuits used to interface the photodiodes to the external circuitry. This current is often referred to as "dark current". At low light levels, the dark current can be a significant fraction of the total current generated by the photodiode, and hence, the resulting output signal has an offset. This leads to one type of non-linearity, since the output signal is no longer proportional to the light intensity.

To correct for the dark current, a separate identical photodiode that is covered by an opaque layer is sometimes included in the light sensor and connected to a separate amplifier. The output of the separate amplifier is then subtracted from the output of the amplifier used to process the current from the light receiving photodiode. While this arrangement, in principle, corrects for the dark current, it introduces additional problems. First, the dark current limits the useful dynamic range of the illuminated photodiode and the amplifier associated with that photodiode. The amplifier has a maximum linear range. If part of that linear range must be utilized to amplify the dark current, then the range remaining for the amplification of the current from the light is reduced. Second, the separate amplification of the dark current also amplifies the noise associated with the dark current. This amplified noise is incorporated into the final output signal obtained by subtracting the amplified dark current from the amplified "light current".

In addition to the problems associated with the removal of the dark current, the amplifiers utilized in prior art light sensors become non-linear at high output currents well before the signals reach the maximum levels that can be supplied by the amplifiers and power supplies. As a result, the prior art systems have a significantly reduced linear range that limits their usefulness in some applications.

SUMMARY OF THE INVENTION

The present invention includes a light sensor having first and second photodetectors and a current mirror. The first photodetector receives a light signal characterized by a light intensity to be measured. The first photodetector generates a light current therethrough proportional to the light intensity and a dark current that is independent of the light signal. The second photodetector is connected in series with the first photodetector at a first node. The second photodetector has a covering that prevents light from reaching the second photodetector. The second photodetector generates a current equal to the dark current. The first photodetector is connected to a power source and the second photodetector is connected to an output node. The current mirror is connected to the first node and the output node and generates an output current that is proportional to the light current through the output node when the output node is connected to an external circuit. In one aspect of the invention, the current mirror includes a first cascoded current mirror having first and second MOS transistors and a depletion mode MOS transistor. In another aspect of the invention, the current mirror also includes a second cascoded current mirror having first and second MOS transistors and a depletion mode MOS transistor. The transistors of the first cascoded current mirror are of a first semiconductor type and the transistors of the second cascoded current mirror are of the opposite semiconductor type.

DETAILED DESCRIPTION OF THE PREFERRED EMBODIMENTS OF THE INVENTION

Figure 1:
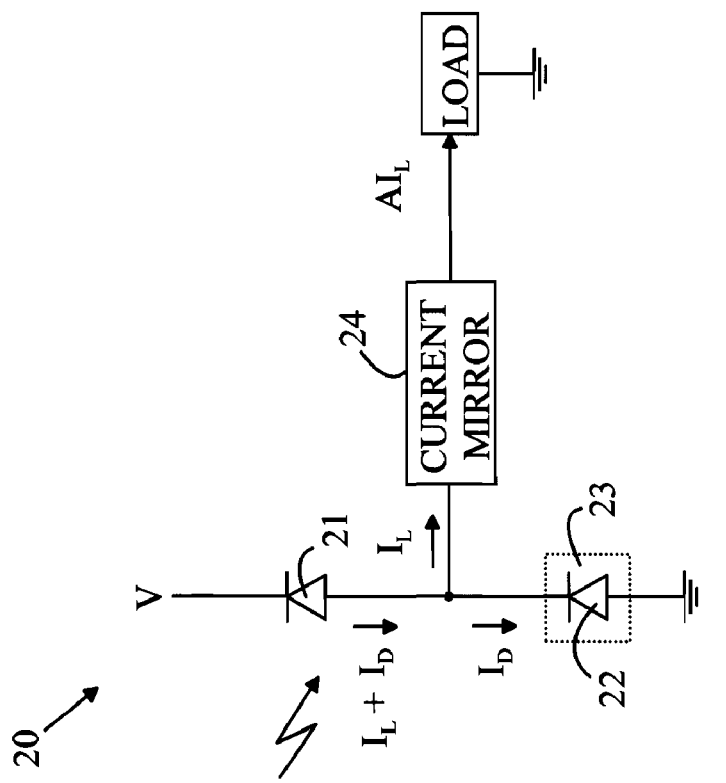
FIG. 1 is a block diagram of one embodiment of a light sensor according to the present invention.

The manner in which the present invention provides its advantages can be more easily understood with reference to FIG. 1, which is a block diagram of one embodiment of a light sensor according to the present invention. Sensor 20 utilizes two identical photodiodes shown at 21 and 22 to provide a current that is proportional to the light intensity received by photodiode 21. Photodiodes 21 and 22 are identical to one another except for a light shield 23 that prevents light from reaching photodiode 22. Hence, when biased, both photodiodes will have the same dark current, $I_D$. Photodiode 21 generates a current equal to $I_L+I_D$ when illuminated with light, where IL is proportional to the light intensity and ID is the dark current through photodiode 21. Since the two photodiodes are identical, the same dark current is sinked by photodiode 22. Hence, a current equal to IL enters current mirror 24 where it is amplified by a factor of A to form the output current signal from sensor 20. Hence, the arrangement shown in FIG. 1 corrects for the non-linearities associated with the dark current without amplifying the dark current and the noise associated therewith.

As noted above, light sensors based on conventional current mirrors suffer from non-linearities at large signal values. The present invention is partially based on the observation that the non-linearities associated with conventional current mirror based amplifiers are the result of the relatively low input impedance of these circuits. Hence, the present invention utilizes a current mirror design that has a significantly greater input impedance, and hence, a significantly greater linear range. The current mirror utilized in the present invention will be referred to as a "cascode current mirror" in the following discussion.

Figure 2:
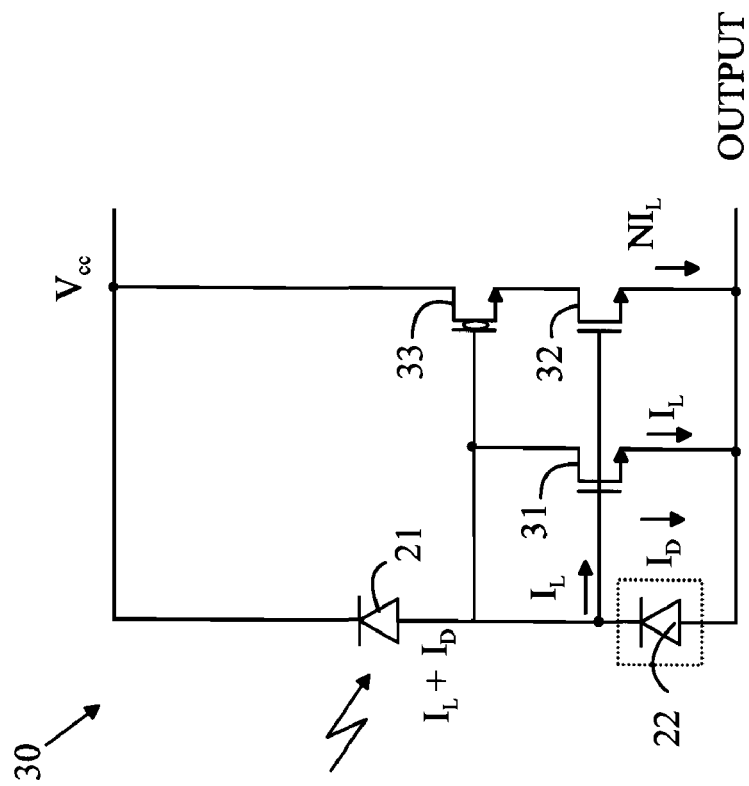
FIG. 2 is a schematic drawing of another embodiment of a light sensor according to the present invention.

Refer now to FIG. 2, which is a schematic drawing of another embodiment of a light sensor according to the present invention. Light sensor 30 utilizes a single stage cascode current mirror to amplify the current from the illuminated photodiode. As noted above, the dark current cancellation is performed by connecting photodiode 21 and photodiode 22 in series at the input to the current mirror stage. The light current $I_L$ flows through the diode-connected NMOS transistor 31. The current mirror consists of the diode-connected NMOS transistor 31, NMOS transistor 32 and depletion NMOS transistor 33. Transistor 32 is N times larger than transistor 31; hence, the current through transistor 32 is N times that through transistor 31. Depletion transistor 33 provides a cascoded current source with very high impedance, and hence, the linear range of the cascode current mirror is significantly greater than that of a conventional current mirror.

Light sensor 30 provides an output current equal to (N+1)$I_L+I_D$. Since ID is <<NIL for typical values of N and IL, the output is essentially a linear function of the illumination level received by photodiode 21. However, there are practical limits to the value of N, and hence, a second stage of amplification is needed in many applications. The second stage can be implemented as a PMOS cascoded current mirror to provide an additional gain factor of M.

Figure 3:
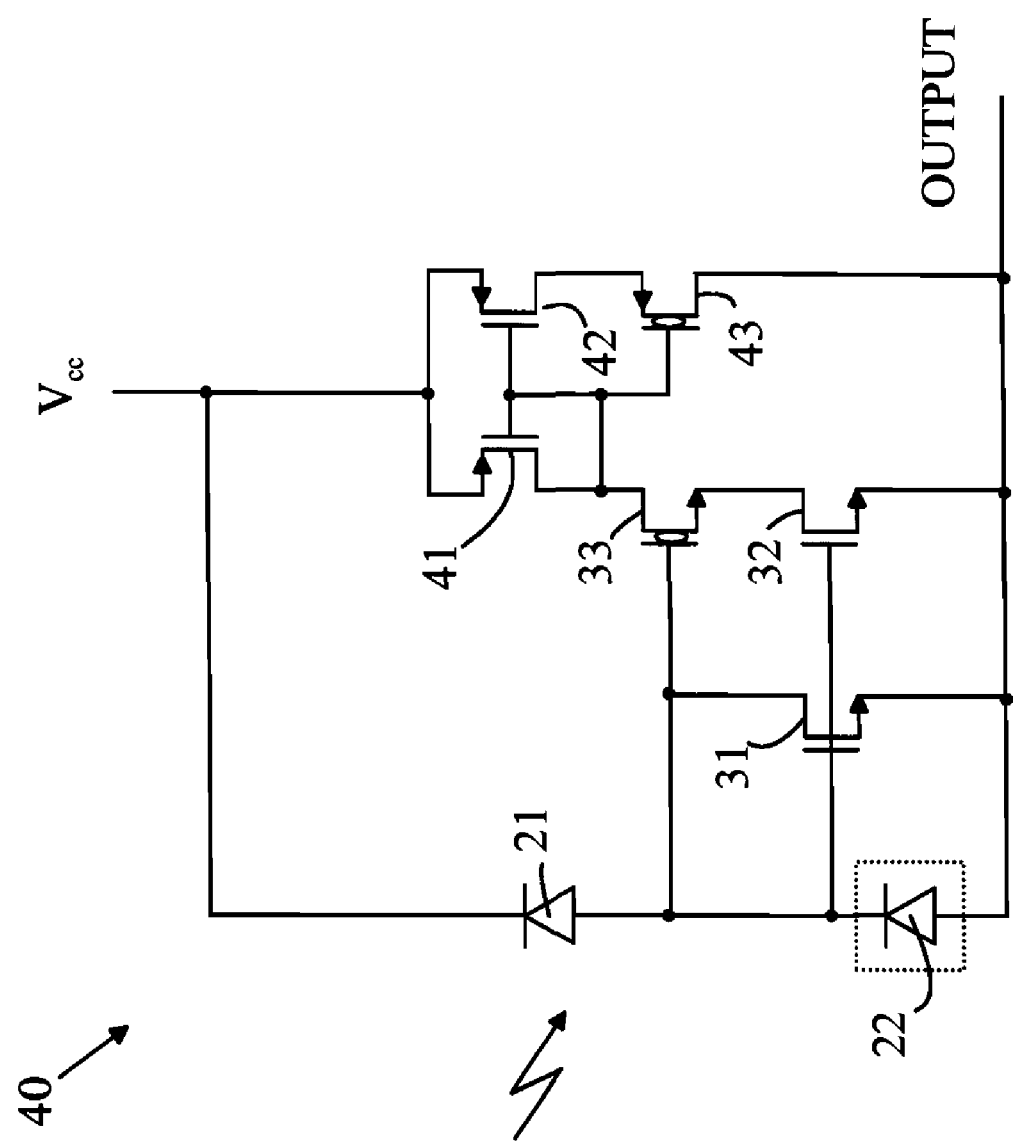
FIG. 3 is a schematic drawing of another embodiment of a light sensor according to the present invention.

Refer now to FIG. 3, which is a schematic drawing of another embodiment of a light sensor according to the present invention. Light sensor 40 utilizes a second PMOS cascoded current mirror consisting of transistors 41-43 to provide an additional gain factor of M, where M is the ratio of the size of transistor 42 to the size of transistor 41. The output of light sensor 40 is $(N*M+N+1)I_L+I_D$ which is essentially equal to $(N*M+N+1)I_L$, since $I_D$ is much smaller than $(N*M)I_L$.

Various modifications to the present invention will become apparent to those skilled in the art from the foregoing description and accompanying drawings. Accordingly, the present invention is to be limited solely by the scope of the following claims.

What is claimed is:

1. A battery-operated mobile device, comprising:
a backlit display having a power level adjustable in accordance with an output signal, the output signal being representative of an ambient light intensity, the power level being adjustable such that the backlit display is visible by a user as the ambient light intensity varies;
a light sensor configured to measure the ambient light intensity and provide the output signal to an external circuit operably connected to the backlit display and configured to vary the power level of the backlit display in accordance with the output signal, the light sensor comprising;
a first photodetector configured to receive a light signal characterized by the ambient light intensity to be measured, said first photodetector generating an output current comprising a light current proportional to said ambient light intensity and a dark current that is independent of said light signal, the output current being provided to a node;
a second photodetector connected in series with said first photodetector at the node, said second photodetector having a covering that prevents light from reaching said second photodetector and generating a sinking current equal to said dark current, said second photodetector being connected to the node and sinking the dark current at the node; and
a high impedance cascode current mirror amplifier circuit connected to the said cascode current mirror amplifier circuit generating a cascode current mirror output current proportional to said light current through said node and providing the cascode current mirror output current to the external circuit;
wherein the first photodectector, the second photodetector, the node and the cascode current mirror amplifier circuit are further configured in respect of one another to compensate for non-linearities associated with the dark current while not amplifying the dark current and noise associated therewith.

2. The light sensor of claim 1, wherein said first and second photodetectors comprise photodiodes having the same size and structure.

3. The light sensor of claim 1, wherein said cascode current mirror comprises a first cascoded current mirror comprising first and second MOS transistors and a depletion mode MOS transistor.

4. The light source of claim 3, wherein said cascode current mirror further comprises a second cascoded current mirror comprising first and second MOS transistors and a depletion mode MOS transistor, and wherein said transistors of said first cascoded current mirror are of a first semiconductor type and said transistors of said second cascoded current mirror are of an opposite semiconductor type.

* * * * *

UNITED STATES PATENT AND TRADEMARK OFFICE
CERTIFICATE OF CORRECTION

| | | |
|---|---|---|
| PATENT NO. | : 7,554,073 B2 | Page 1 of 1 |
| APPLICATION NO. | : 11/625767 | |
| DATED | : June 30, 2009 | |
| INVENTOR(S) | : Richard Lum, Bin Zhang and Kah Weng Lee | |

It is certified that error appears in the above-identified patent and that said Letters Patent is hereby corrected as shown below:

Column 4, Line 29, Claim 1, after "the" insert -- node, --;

Column 4, Line 34, Claim 1, delete "photodectector," and insert -- photodetector, --;

Column 4, Line 40, Claim 2, delete "light sensor" and insert -- battery operated mobile device --;

Column 4, Line 43, Claim 3, delete "light sensor" and insert -- batter operated mobile device --;

Column 4, Line 47, Claim 4, delete "light source" and insert -- battery operated mobile device --.

Signed and Sealed this
Twenty-sixth Day of February, 2013

Teresa Stanek Rea
*Acting Director of the United States Patent and Trademark Office*